United States Patent
Liang et al.

(10) Patent No.: US 11,981,569 B2
(45) Date of Patent: May 14, 2024

(54) METHOD FOR PREPARING HETEROATOM-DOPED CNHS

(71) Applicant: KUNMING UNIVERSITY OF SCIENCE AND TECHNOLOGY, Kunming (CN)

(72) Inventors: Feng Liang, Kunming (CN); Zhipeng Xie, Kunming (CN); Da Zhang, Kunming (CN)

(73) Assignee: KUNMING UNIVERSITY OF SCIENCE AND TECHNOLOGY, Kunming (CN)

( * ) Notice: Subject to any disclaimer, the term of this patent is extended or adjusted under 35 U.S.C. 154(b) by 0 days.

(21) Appl. No.: 18/304,316

(22) Filed: Apr. 20, 2023

(65) Prior Publication Data

US 2023/0286805 A1 Sep. 14, 2023

Related U.S. Application Data

(62) Division of application No. 17/964,887, filed on Oct. 12, 2022, now Pat. No. 11,667,530.

(30) Foreign Application Priority Data

Mar. 9, 2022 (CN) .......................... 202210233119.8

(51) Int. Cl.
| | |
|---|---|
| *C01B 32/18* | (2017.01) |
| *B01J 21/18* | (2006.01) |
| *B01J 23/42* | (2006.01) |
| *B01J 35/23* | (2024.01) |
| *B01J 37/08* | (2006.01) |

(52) U.S. Cl.
CPC ............. *C01B 32/18* (2017.08); *B01J 21/18* (2013.01); *B01J 23/42* (2013.01); *B01J 35/23* (2024.01); *B01J 37/08* (2013.01)

(58) Field of Classification Search
CPC .. C01B 32/18; B01J 21/18; B01J 23/42; B01J 35/0013; B01J 37/08
See application file for complete search history.

(56) References Cited

U.S. PATENT DOCUMENTS

2006/0008404 A1* 1/2006 Hwang ................. B82Y 40/00
204/173

FOREIGN PATENT DOCUMENTS

| CN | 101337184 A | 1/2009 |
|---|---|---|
| CN | 104190412 A | 12/2014 |
| CN | 103515627 B | 2/2016 |
| CN | 105312087 A | 2/2016 |
| CN | 105312087 B | 11/2017 |

* cited by examiner

*Primary Examiner* — James A Fiorito

(57) ABSTRACT

A method includes the following steps: a first step: the material containing heteroatom and graphite powder are mixed for a preset time by grinding, and the molar ratio of heteroatom to carbon atom is 1%-10%, then the heteroatom precursors are obtained; a second contact step: the heteroatom precursor is filled into a graphite rod with holes and compacted, then the graphite rod is dried for a preset time to obtain a plasma anode and using a DC arc plasma device to prepare the graphite anode into heteroatom-doped CNHs; a third contact step: the heteroatom-doped CNHs are dispersed in a reducing solution, a platinum salt is added to stir evenly, the reduction reaction is carried out by heating and stirring, and after centrifugation, washing and drying, a catalyst with platinum loading is obtained.

9 Claims, 10 Drawing Sheets

---

Preparation of heteroatom precursor: the materials containing heteroatoms and graphite powder are mixed by grinding with a molar ratio of heteroatoms to carbon atoms is 1% to 20% for a predetermined time to obtain a heteroatom precursor.

Preparation of graphite anode: the heteroatom precursor is filled into a graphite rod with holes and compacted, and the graphite rod is dried for a predetermined time to obtain the materials of plasma anode.

Preparation of heteroatom doped carbon nanohorns: putting graphite rod with heteroatom precursor as an anode into a DC arc plasma device, a graphite rod sharpened at one end as a cathode and is arranged opposite to the anode, filling the plasma device with preset gas, and then starting the plasma device to synthesis heteroatom doped carbon nanohorns.

Preparation of heteroatom doped carbon nanohorns supporting platinum: the heteroatom-doped carbon nanohorns are dispersed in a reducing solution, then the platinum salt and reducing agent are added in the solution and stirred evenly. Then the solution is heated and stirred to carry out a reduction reaction. After reduction reaction, the catalysts are washed and dried, then the platinum-supported catalyst with heteroatom-doped carbon nanohorns as a carrier and platinum nanoparticles as an active component is obtained.

Preparation of heteroatom precursor: the materials containing heteroatoms and graphite powder are mixed by grinding with a molar ratio of heteroatoms to carbon atoms is 1% to 20% for a predetermined time to obtain a heteroatom precursor.

Preparation of graphite anode: the heteroatom precursor is filled into a graphite rod with holes and compacted, and the graphite rod is dried for a predetermined time to obtain the materials of plasma anode.

Preparation of heteroatom doped carbon nanohorns: putting graphite rod with heteroatom precursor as an anode into a DC arc plasma device, a graphite rod sharpened at one end as a cathode and is arranged opposite to the anode, filling the plasma device with preset gas, and then starting the plasma device to synthesis heteroatom doped carbon nanohorns.

Preparation of heteroatom doped carbon nanohorns supporting platinum: the heteroatom-doped carbon nanohorns are dispersed in a reducing solution, then the platinum salt and reducing agent are added in the solution and stirred evenly. Then the solution is heated and stirred to carry out a reduction reaction. After reduction reaction, the catalysts are washed and dried, then the platinum-supported catalyst with heteroatom-doped carbon nanohorns as a carrier and platinum nanoparticles as an active component is obtained.

FIG. 1

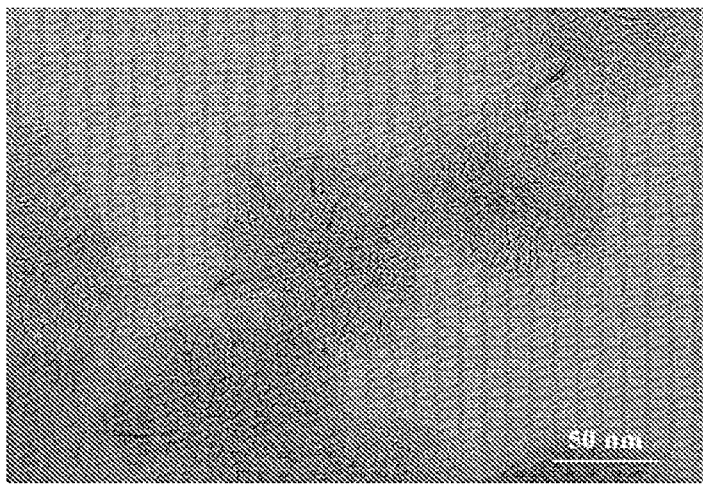

FIG. 2

METHOD FOR PREPARING HETEROATOM-DOPED CNHS

CROSS-REFERENCE TO RELATED APPLICATIONS

The present application claims foreign priority to Chinese Patent Application No. CN202210233119.8, titled: Method, catalyst and application of heteroatom-doped carbon nanohorns supporting platinum, filed on Mar. 9, 2022 in the State Intellectual Property Office of China, and the entire contents of which is hereby incorporated by reference. The present application is a division of U.S. patent application Ser. No. 17/964,887, titled: METHOD FOR PREPARING HETEROATOM-DOPED CNHS AND HETEROATOM-DOPED CARBON NANOHORNS SUPPORTING PLATINUM, AND CATALYST, filed on Oct. 12, 2022.

TECHNICAL FIELD

The present disclosure relates to the technical field of preparation of catalytic materials, in particular to method for preparing heteroatom-doped CNHs.

BACKGROUND

Fuel cells have attracted worldwide attention due to their high energy conversion efficiency (40%-60%), low noise, green environmental protection, sustainable operation, high power density, stable output, and safe operation. In recent years, formic acid is in a liquid state at room temperature, with a low freezing point, non-toxic, and non-flammable. It is suitable for low-temperature work, and is relatively safe. Compared with traditional methanol fuel, formic acid has advantages. In addition, formic acid is a good electrolyte, which is conducive to charge conduction after ionization, has a small contact resistance, and has a higher open circuit voltage than methanol. And it can work at higher concentrations, the actual working energy density is higher than that of direct methanol fuel cells, and the corresponding cathode poisoning phenomenon is not obvious. In addition, the theoretical open circuit potential of formic acid fuel cells is 1.45 V, which is higher than methanol. At present, direct formic acid fuel cell catalysts mainly focus on Pt-based binary or multi-component catalysts. Within a certain range, the catalytic effect increases with the increase of the content of Pt, but platinum is precious metal, and the increase of the content of platinum greatly increases the production cost of the catalyst. At the same time, since Pt is prone to agglomeration during the catalytic process, the catalytic ability is greatly reduced. Therefore, in order to alleviate this phenomenon, efforts have been devoted to loading Pt nanoparticles on carriers to enhance their stability. At present, the large-scale fuel cell catalysts on the market are still dominated by commercial Pt/C catalysts. This catalyst uses activated carbon as a carrier, which cannot effectively avoid the agglomeration of platinum nanoparticles. At the same time, the loading of platinum to meet the requirements of suitable fuel cell catalysts is also too large, and the cost is relatively high. Since the 1960s, carbon materials doped with heteroatoms, such as oxygen (O), nitrogen (N), sulfur (S), phosphorus (P), boron (B), and fluorine (F), etc., has resulted in energy storage and conversion more attention. Since the size and electronegativity of these doping elements are different from carbon, structural deformation and charge density changes can occur in doped carbon materials. In addition, the type, amount and complexity of doping heteroatoms have important implications for the overall performance of carbon materials in energy storage and conversion. Heteroatom doping has been a research hotspot and has been widely used in batteries, SCs, and ORR. For example, nitrogen doping creates more defects and active sites in the structure and enhances its electronic conductivity, which is beneficial for battery performance, and it also improves surface wettability, which is beneficial for SCs. The doped sulfur participates in the conversion reaction, which greatly improves the battery performance and capacitance of the material. In addition, the introduction of sulfur increases the interlayer spacing of the material, which is beneficial to the storage of ions; the atomic size of boron atoms is close to that of carbon atoms, and the doping of boron atoms into the carbon skeleton does not affect the overall structure of carbon, because boron has a unique 3 electrons, boron-doped carbon materials have high electronic conductivity and ion adsorption capacity, which are beneficial to both SCs and ORR. Therefore, heteroatom doping of carbon nanomaterials is an effective way to obtain high-performance platinum catalyst supports. At present, there are two main methods for heteroatom doping of carbon materials. One is to heat the heteroatom compound in an inert atmosphere. This kind of method is difficult to obtain a unique structure of heteroatom-doped carbon nanohorns supporting platinum. The other method is to use a heteroatom source to post-process the carbon material. This method has relatively complicated processing steps and a low amount of heteroatom doping. Therefore, it is necessary to design a method for heteroatom-doped carbon nanohorns supporting platinum catalyst, which can realize in-situ doping of one or more heteroatoms, and technically solve the technical difficulties of the above two methods. At the same time, the heteroatom-doped carbon nanomaterials were used as carriers to realize the platinum catalysts for high-activity fuel cells.

BRIEF DESCRIPTION OF DRAWINGS

FIG. 1 is a flow chart showing a method for heteroatom-doped carbon nanohorns supporting platinum.

FIG. 2 is a transmission electron microscope (TEM) image of the catalyst carrier prepared in Example 1.

The X-ray photoelectron spectroscopy (XPS) of the catalyst prepared in Example 1.

DETAILED DESCRIPTION

Definition

Figure 3:
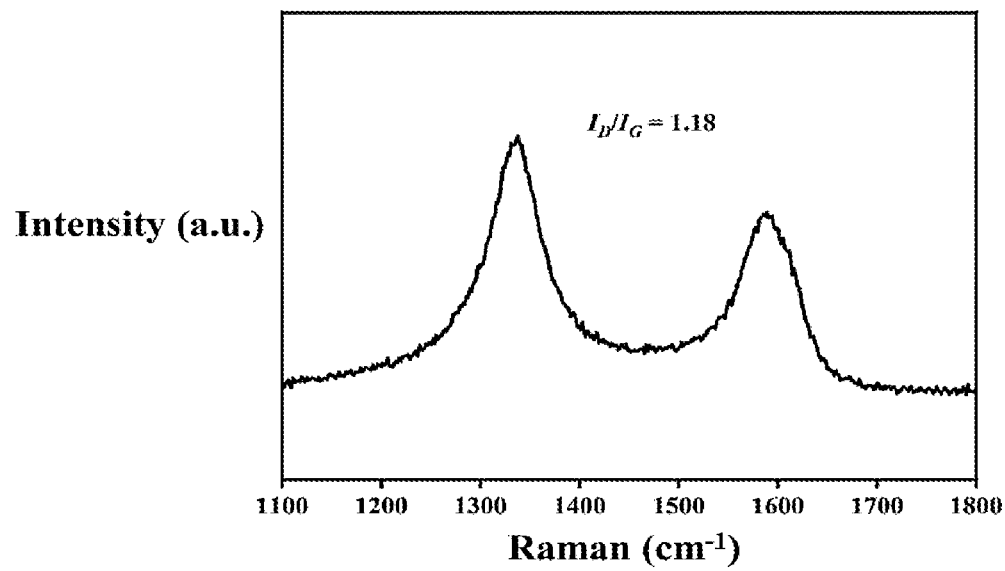
FIG. 3 is a is Raman spectrometry of catalyst carrier prepared in Example 1.

Carbon nanohorns (CNHs): the definition is the same as the patent of U.S. Ser. No. 11/370,663B1. Since the preparation of CNHs by arc plasma requires the use of nitrogen, the as-prepared original CNHs contain nitrogen atoms.

Heteroatom-doped: nonmetallic atoms (except for nitrogen atoms) are doped in the CNHs.

First Aspect

A first aspect of the present disclosure relates to a method for preparing heteroatom-doped CNHs supporting platinum, the method including:
   a. the materials containing heteroatoms and graphite powder are mixed by grinding with a molar ratio of heteroatoms to carbon atoms is 1% to 10% for a predetermined time to obtain a heteroatom precursor.
   b. the heteroatom precursor is filled into a graphite rod with holes and compacted, and the graphite rod is dried for a predetermined time to obtain the materials of plasma anode.
   c. Putting graphite rod with heteroatom precursor as an anode into a DC arc plasma device, a graphite rod sharpened at one end as a cathode and is arranged opposite to the anode, filling the plasma device with preset gas, and then starting the plasma device to synthesis heteroatom-doped CNHs.
   d. The heteroatom-doped CNHs are dispersed in a reducing solution, then the platinum salt and reducing agent are added in the solution and stirred evenly. Then the solution is heated and stirred to carry out a reduction reaction to obtain catalysts. After reduction reaction, the catalysts are washed and dried, then the platinum-supported catalyst with heteroatom-doped CNHs as a carrier and platinum nanoparticles as an active component is obtained.

In the first step of the method of the present disclosure, the materials containing heteroatoms is at least one of sulfur or sulfur-containing organic matter, phosphorus or phosphorus-containing organic matter, nitrogen-containing organic matter, chlorine-containing organic matter, fluorine-containing organic matter, bromine-containing organic matter, and iodine-containing organic matter. The predetermined time for mixing is 20-40 min.

In the second step of the method of the present disclosure, the diameter of the graphite rod is 10 mm-60 mm and the diameter of the hole on the graphite rod is 5-10 mm, the compaction pressure of the heteroatom precursor in the graphite rod is 0.02 MPa to 0.05 MPa. The predetermined temperature and predetermined time for drying are 60-80° C. and 4-6 h respectively.

In the third step of the method of the present disclosure, the diameter of the cathode graphite rod is the same as the graphite rod in second step, and the distance between cathode and anode is 2-4 mm. The pressure of preset gas is 50-90 kPa. The working current of DC arc plasma device is preferably higher than 150 A. In that case, production rate of CNHs can be improved.

In the present disclosure, a duration of the discharge time of the DC arc plasma device is not specifically limited as long as purpose of the present disclosure may be achieved. Generally, as long as the anode graphite rod is not exhausted, the DC arc plasma device can be discharged continuously.

Preset gas used in the present disclosure may be nitrogen argon gas mixture, nitrogen hydrogen mixture, and nitrogen helium mixture. In a specific embodiment, a ratio of other gas to nitrogen is 0-20%, such as 0:1, such as 1:6, such as 1:5, such as 1:4. In a preferred embodiment, the ratio of other gas to nitrogen is 0:1. The nitrogen preset gas can ionize nitrogen atoms and nitrogen ion in DC arc plasma device which promote the formation of CNHs. During the growth of CNHs, heteroatoms are in situ doped into CNHs to form heteroatom-doped CNHs.

The heteroatom-doped CNHs prepared by the method of the present disclosure has a spherical diameter of 50-80 nm, such as 50-60 nm, such as 60-70 nm, preferably 50-60 nm. The step c includes quenching, the spherical diameter of the heteroatom-doped CNHs prepared can be controlled by a quenching speed in the DC arc plasma device, and a flow rate of cooling water used in the quenching. The flow rate of cooling water is 1-5 m/s. Preferably 3-5 m/s, such as 3 m/s, such as 3.5 m/s, such as 4.5 m/s, such as 5 m/s.

In the fourth step of the method of the present disclosure, the reducing solution includes at least one of ethylene glycol, hydrazine hydrate, and sodium borohydride. The stirring speed and stirring time of CNHs dispersed in the reducing solution are 200-400 r/min and 5-15 min respectively. The platinum salt includes at least one of chloroplatinic acid or chloroplatinous acid. The volume of the added platinum salt solution is 1-2 ml. The stirring speed and stirring time after adding platinum salt in reducing solution are 200-400 r/min and 5-15 min respectively. The reaction temperature, reaction time, stirring speed are 140-160° C., 2-3 h, and 150-200 r/min respectively.

The platinum-supported catalyst has a large number of active sites, platinum nanoparticles with a particle size of 1 nm to 8 nm are supported on a surface of heteroatom-doped CNHs, and the platinum nanoparticles have a uniform particle size and no agglomeration.

The heteroatom-doped CNHs supporting platinum especially exhibits great practicability in applications. For example, the heteroatom-doped CNHs of the present disclosure can be applied to fuel cells, dehydrogenation reactions, aromatic ring hydrogenation reactions, hydrogen peroxide decomposition or gas purification.

Second Aspect

A second aspect of the present disclosure relates to a method for preparing heteroatom-doped CNHs. The method includes steps a, b and c.

The heteroatom-doped CNHs obtained by the method of the present disclosure has an $I_D/I_G$ vale of 1.05-1.2.

In a specific embodiment, the heteroatom-doped CNHs of the present disclosure has a spherical diameter, i.e., a spherical diameter of the N—SWCNHs, preferably smaller than 80 nm. In a specific embodiment, the heteroatom-doped CNHs of the present disclosure has an $I_D/I_G$ vale of 1.18. In a specific embodiment, the atomic contents of sulfur, nitrogen, platinum of the present disclosure are 1.1%, 1% and 2.3% respectively. In a specific embodiment, the platinum nanoparticles are supported on the heteroatom-doped CNHs of the present disclosure has an average spherical diameter of 4.1 nm.

Third Aspect

A third aspect of the present disclosure relates to the application of heteroatom-doped CNHs supporting platinum of the present disclosure or the heteroatom-doped CNHs supporting platinum obtained by the method of the present disclosure. The heteroatom-doped CNHs supporting platinum product prepared by the present disclosure can be used in various known platinum carbon catalyst applications, but is broader than it. The heteroatom-doped CNHs supporting platinum has a very wide material application range. Currently, the heteroatom-doped CNHs supporting platinum of the present disclosure may be applied in fuel cells, dehydrogenation reactions, aromatic ring hydrogenation reactions, hydrogen peroxide decomposition or gas purification.

Example 1 of the present disclosure illustrates the application of the heteroatom-doped CNHs supporting platinum of the present disclosure in ORR, wherein the heteroatom-doped CNHs supporting platinum of the present disclosure have excellent oxygen catalytic activity and stability. The doping of heteroatom introduces more active sites, which together with platinum nanoparticles enhances oxygen catalytic performance. In addition, the CNHs with unique limited domain structure prevents agglomeration of platinum nanoparticles effectively, resulting in excellent catalytic stability. This effect is obviously superior to that of commercial platinum carbon catalysts in prior art.

Test Methods

The heteroatom-doped CNHs (the characterization thereof): the heteroatom-doped CNHs may be characterized by infrared spectrum (IR), Raman spectrum, TEM, scanning electron microscope (SEM), BET measurements, XPS and other methods. In the present application, the heteroatom-doped CNHs is characterized mainly by Raman spectrum, TEM and BET measurements, wherein there are D peak and G peak at 1350 cm$^{-1}$, 1580 cm$^{-1}$ in Raman spectrum; The specific surface area, total pore volume and average pore size.

The heteroatom-doped CNHs supporting platinum (the characterization thereof): the heteroatom-doped CNHs supporting platinum may be characterized by IR, TEM, BET measurements, XPS and other methods. In the present application, the heteroatom-doped CNHs is characterized mainly by TEM and XPS.

Spherical diameter: The spherical diameter of the platinum nanoparticles supported on heteroatom-doped CNHs may be measured by TEM and other methods. The results measured by these methods are similar. In the present disclosure, the spherical diameter is measured mainly by TEM.

Specific surface area: In the present disclosure, the specific surface area, total pore volume and average pore size may be measured by BET.

The content of heteroatoms and platinum atoms: The content of heteroatoms and platinum atoms in catalyst may be measured by elemental analysis, XPS and other methods. In the present disclosure, the content of heteroatoms and platinum atoms are measured mainly by XPS.

Example 1

The heteroatom precursor was obtained by mixing sulfur element and graphite powder for 20 min, sulfur is selected for substances containing sulfur heteroatoms and the molar ratio of sulfur to carbon atoms is 5%.

The heteroatom precursor is filled into a graphite rod drilled with an outer diameter of 10 mm and an inner diameter of 4 mm. Then the filling is compacted with a pressure of 0.03 MPa.

Put the graphite rod with heteroatom precursor into an arc plasma device which works as anode, a graphite rod sharpened at one end as a cathode, and perform plasma treatment in a 70 kPa nitrogen atmosphere. Then the working current is 200 A, and the flow rate of cooling water is 5 m/s. After the discharge, let stand for one hour and collect the nitrogen-sulfur atom doped CNHs (NS—CNHs).

The NS—CNHs are dispersed in 40 ml of ethylene glycol, stir for 15 min, then add 1 ml of 0.05 mol·L$^{-1}$ chloroplatinic acid ethylene glycol solution and add 800 mg of sodium hydroxide, the solution continued to stir for 15 min. Next, the mixed solution is stirred and heated in an oil bath for 3 h, the stirring rate and heating temperature are 200 r/min and 150° C. respectively. After cooling to room temperature, the mixed solution is washed 5 times with distilled water and ethanol, and is dried in a vacuum drying oven at 60° C. for 12 h to obtain NS—CNHs which are supported platinum catalyst (Pt\NS—CNHs).

Figure 4:
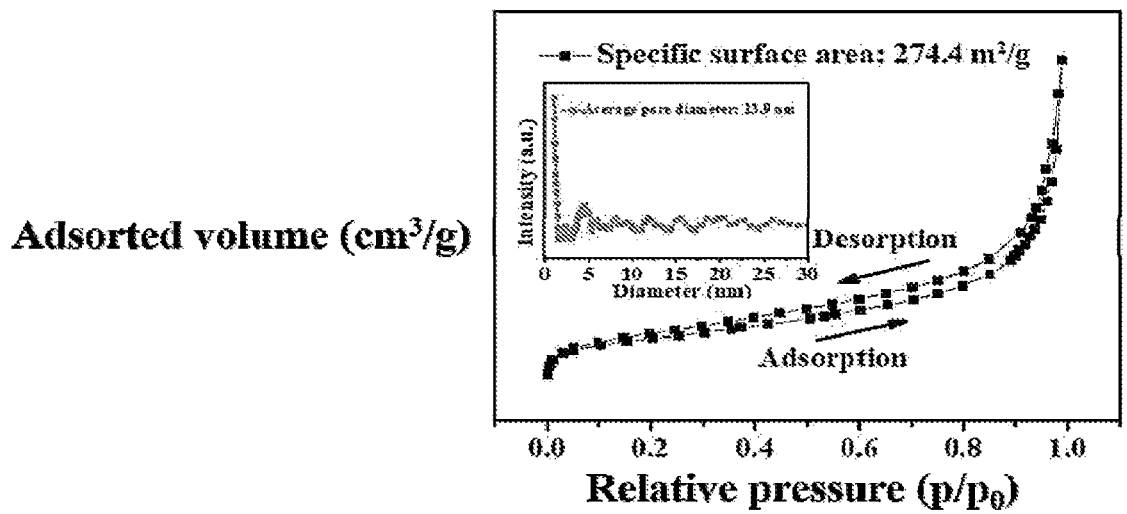
FIG. 4 is a Brunner-Emmet-Teller (BET) measurements of catalyst carrier prepared in Example 1 and the inset is pore size distribution.
Figure 5:
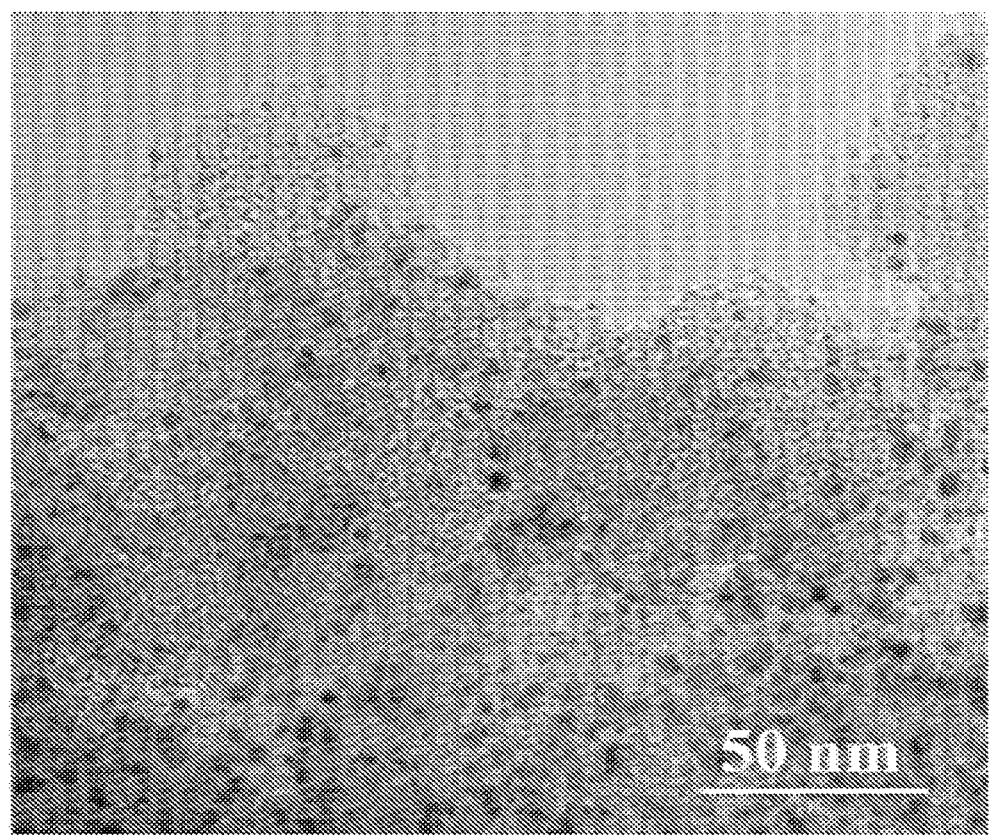
FIG. 5(A) and FIG. 5(B) are TEM image and particle diameter distribution of platinum of the catalyst prepared in Example 1.
Figure 5:
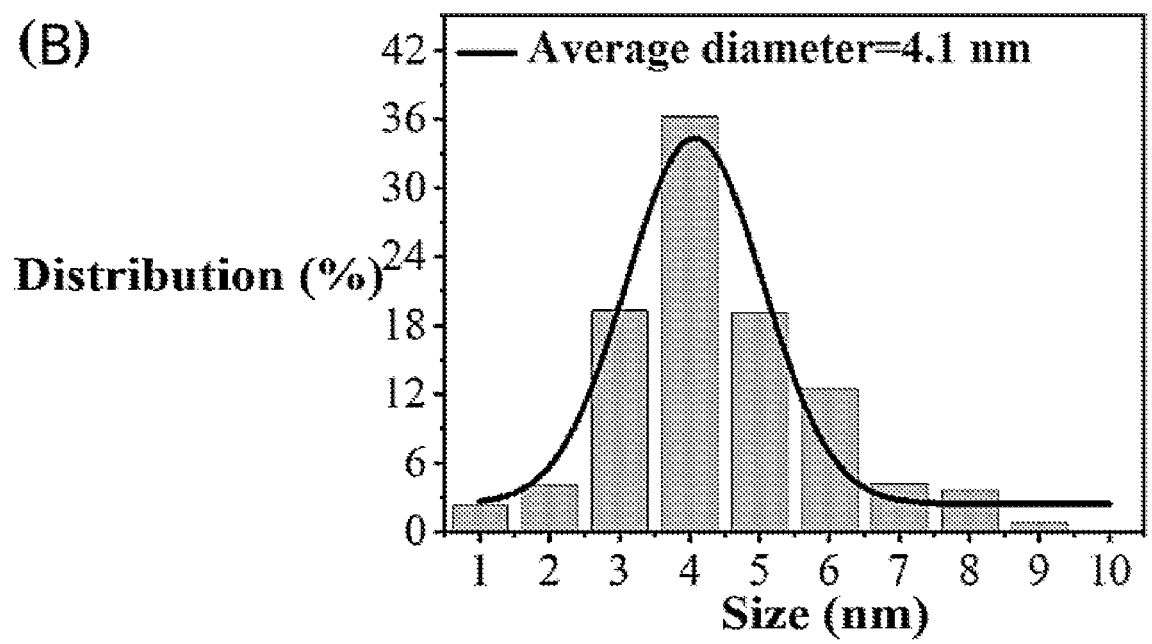
Figure 6:
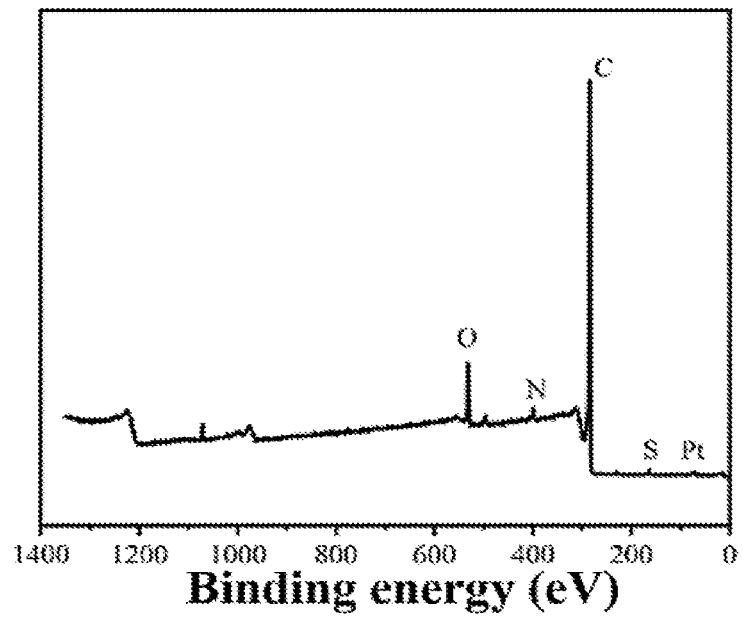
FIG. 6(A) is survey spectra for survey spectrum.
FIG. 6(B) is XPS survey spectra for the S 2p regions.
FIG. 6(C) is XPS survey spectra for the Pt 4f regions.
Figure 6:
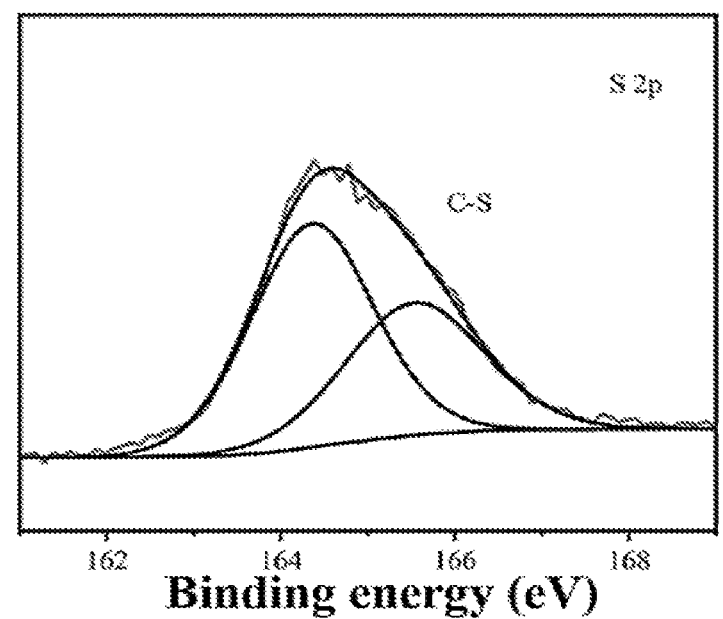
Figure 6:
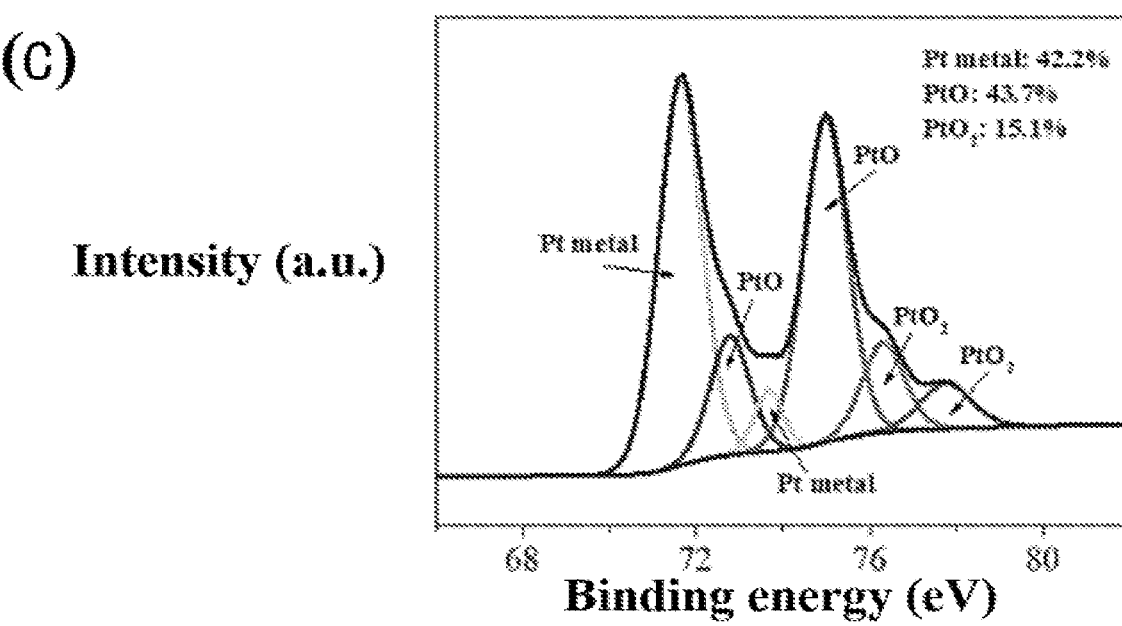
Figure 7:
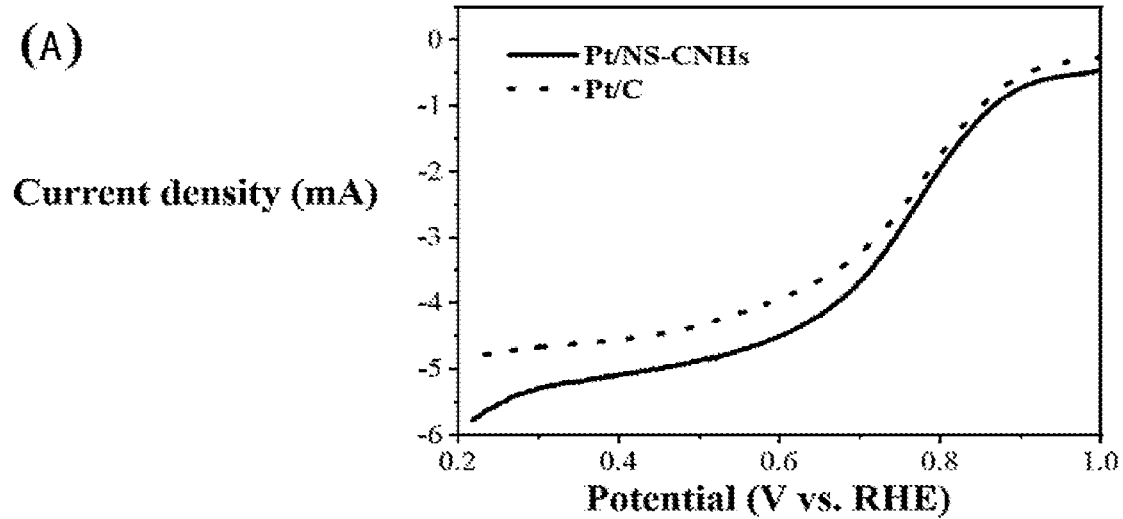
FIG. 7(A) is ORR polarization curves of the catalysts prepared in Example 1 and commercial Pt/C at a rotating speed of 1600 rpm in 0.1 M $HClO_4$ solution.
FIG. 7(B) is CV curves of the catalysts prepared in Example 1 in $O_2$-saturated 0.1 M $HClO_4$ electrolyte before and after 10000 cycles.
Figure 7:
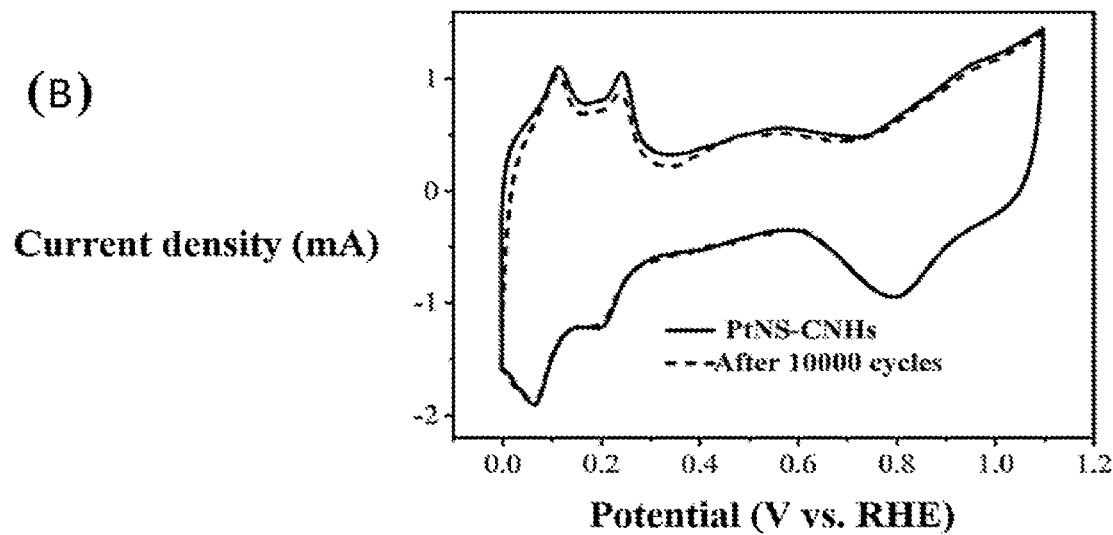

In Example 1, the TEM image of the NS—CNHs shows that the NS—CNHs are dahlia shaped, and its surface has a large number of horn-like structures (FIG. 2). These unique structures provide limited domain structure, so the platinum nanoparticles can be effectively prevented to agglomerate. Raman spectrum of NS—CNHs prepared (FIG. 3) shows that the $I_D/I_G$ vale is 1.18. It is attributed to the doping of sulfur atoms that further increases the structural defects of CNHs and thus providing more active sites. The FIG. 4 shows that the BET of the NS—CNHs prepared in Example 1, the average pore diameter of NS—CNHs is 13.9 nm, in addition, the increase of defect content increases specific surface area of NS—CNHs. Therefore, the specific surface area of NS—CNHs is 274.4 m$^2$/g. In FIG. 5(A), the TEM image of the Pt\NS—CNHs shows that the Pt nanoparticles are uniformly loaded on NS—CNHs. In addition, as shown in FIG. 5(B), the particle size distribution diagram shows that the size distribution of Pt nanoparticles is relatively uniform, mostly between 3-6 nm, and the average spherical diameter of particles is 4.1 nm. To deeply investigate the surface properties of the as-prepared Pt\NS—CNHs, the samples are characterized by XPS. As shown in FIG. 6(A), the peaks at 73 eV, 165 eV, 284 eV, 399 eV, and 533 eV correspond to the peaks of Pt 4f, S 2p, C 1s, N 1s, and O 1s respectively. As shown in S 2p XPS spectrum (FIG. 6(B)), it can be obviously observed the binding energy at 164.7 eV and 165.8 that belonged to C—S bonds. This result indicates that the S element is doped into the CNHs successfully. In FIG. 6(C), the Pt 4f XPS spectrum show that the main forms of Pt in Pt \NS—CNHs are metal Pt, PtO and PtO$_2$, accounting for 42.2%, 43.7% and 15.1% respectively. The Pt\NS—CNHs catalyst prepared in Example 1 is applied to the ORR reaction in 0.1M HClO$_4$ electrolyte, linear sweep voltammetry (LSV) curves (FIG. 7(A)) collected using a rotating disk electrode (RDE) technique at 1600 rpm is further employed to evaluated the intrinsic ORR electrocatalytic properties of this catalysts. Pt\NS—CNHs exhibits the outstanding diffusion-limiting current density ($J_L$=5.37 mA cm$^{-2}$) and the excellent positive onset potential ($E_{onset}$=0.995 V) and half-wave potential ($E_{1/2}$=0.846 V vs RHE). These values are more favorable than those of commercial Pt/C ($J_L$=4.92 mA cm$^{-2}$, $E_{onset}$=0.986 V, $E_{1/2}$=0.839 V). As shown in FIG. 7(B), no obvious negative shift is observed for ORR peak potential after 10000 continuous cycles, indicating excellent stability in acidic electrolytes.

Example 2

The heteroatom precursor is obtained by mixing sulfur element and graphite powder for 30 min. The thiourea is selected for substances containing sulfur heteroatoms and the molar ratio of sulfur to carbon atoms is 8%.

The heteroatom precursor is filled into a graphite rod drilled with an outer diameter of 10 mm and an inner diameter of 4 mm. Then the filling is compacted with a pressure of 0.04 MPa.

Put the graphite rod with heteroatom precursor into an arc plasma device which works as anode, a graphite rod sharpened at one end as a cathode, and perform plasma treatment in a 70 kPa ($Ar:N_2=1:4$) atmosphere. Then the working current is 175 A, and the flow rate of cooling water is 4.5 m/s. After the discharge, let stand for one hour and collect the nitrogen-sulfur atom doped CNHs (NS—CNHs).

The NS—CNHs are dispersed in 40 ml of ethylene glycol, stir for 15 min, then add 1.5 ml of 0.05 mol $L^{-1}$ chloroplatinic acid ethylene glycol solution and add 800 mg of sodium hydroxide, the solution continued to stir for 15 min. Next, the mixed solution is stirred and heated in an oil bath for 3 h, the stirring rate and heating temperature are 200 r/min and 160° C. respectively. After cooling to room temperature, the mixed solution is washed 5 times with distilled water and ethanol, and is dried in a vacuum drying oven at 60° C. for 10 h to obtain NS—CNHs which are supported platinum catalyst (Pt\NS—CNHs).

Figure 8:
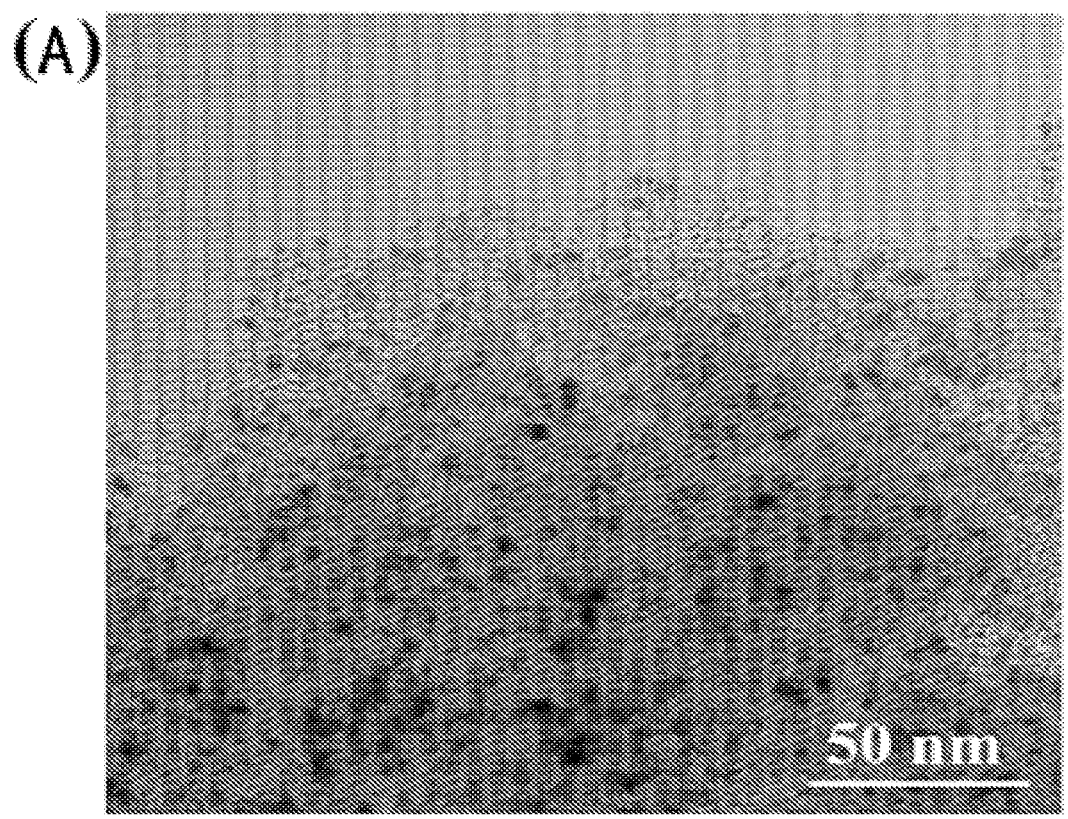
FIG. 8(A) and FIG. 8(B) are TEM image and particle diameter distribution of platinum of the catalyst prepared in Example 2.
Figure 8:
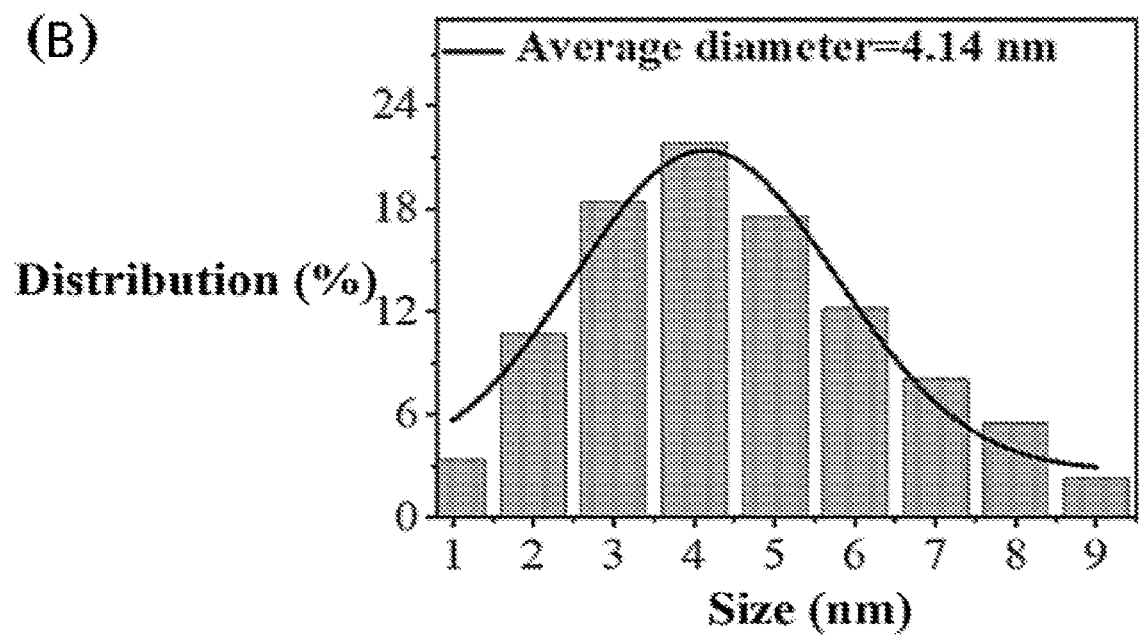

In FIG. 8(A), the TEM image of the Pt\NS—CNHs shows that the Pt nanoparticles are uniformly loaded on NS—CNHs. In addition, as shown in FIG. 8(B), the particle size distribution diagram shows that the size distribution of Pt nanoparticles is relatively uniform, mostly between 2-8 nm, and the average spherical diameter of particles is 4.14 nm.

Example 3

The heteroatom precursor was obtained by mixing chlorine element and graphite powder for 20 min. The cetyltrimethylammonium chloride is selected for substances containing chlorine heteroatoms and the molar ratio of chlorine to carbon atoms is 5%.

The heteroatom precursor is filled into a graphite rod drilled with an outer diameter of 10 mm and an inner diameter of 4 mm. Then the filling is compacted with a pressure of 0.05 MPa.

Put the graphite rod with heteroatom precursor into an arc plasma device which works as anode, a graphite rod sharpened at one end as a cathode, and perform plasma treatment in an 80 kPa ($H_2:N_2=1:5$) atmosphere. Then the working current is 150 A, and the flow rate of cooling water is 5 m/s. After the discharge, let stand for one hour and collect the nitrogen-chlorine atom doped CNHs (NCl—CNHs).

The NCl—CNHs are dispersed in 40 ml of ethylene glycol, stir for 15 min, then add 1.5 ml of 0.05 mol $L^{-1}$ chloroplatinic acid ethylene glycol solution and add 800 mg of sodium hydroxide, the solution continued to stir for 15 min. Next, the mixed solution is stirred and heated in an oil bath for 3 h, the stirring rate and heating temperature are 180 r/min and 140° C. respectively. After cooling to room temperature, the mixed solution is washed 5 times with distilled water and ethanol, and is dried in a vacuum drying oven at 80° C. for 8 h to obtain NCl—CNHs which are supported platinum catalyst (Pt\NCl—CNHs).

Figure 9:
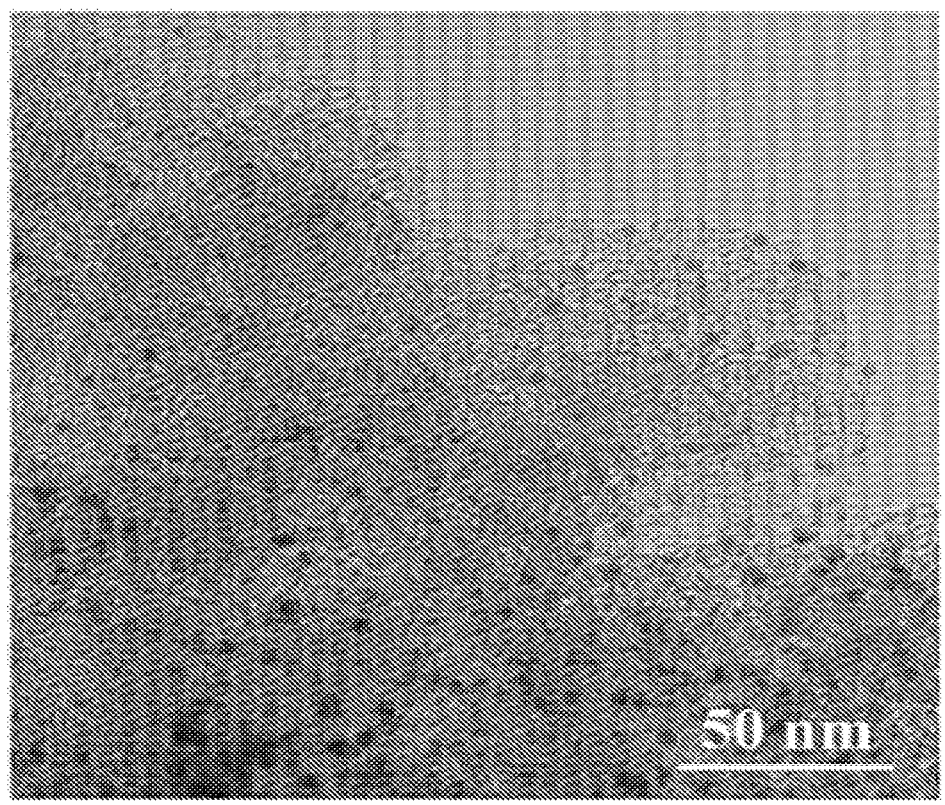
FIG. 9(A) and FIG. 9(B) are TEM image and particle diameter distribution of platinum of the catalyst prepared in Example 3.
Figure 9:
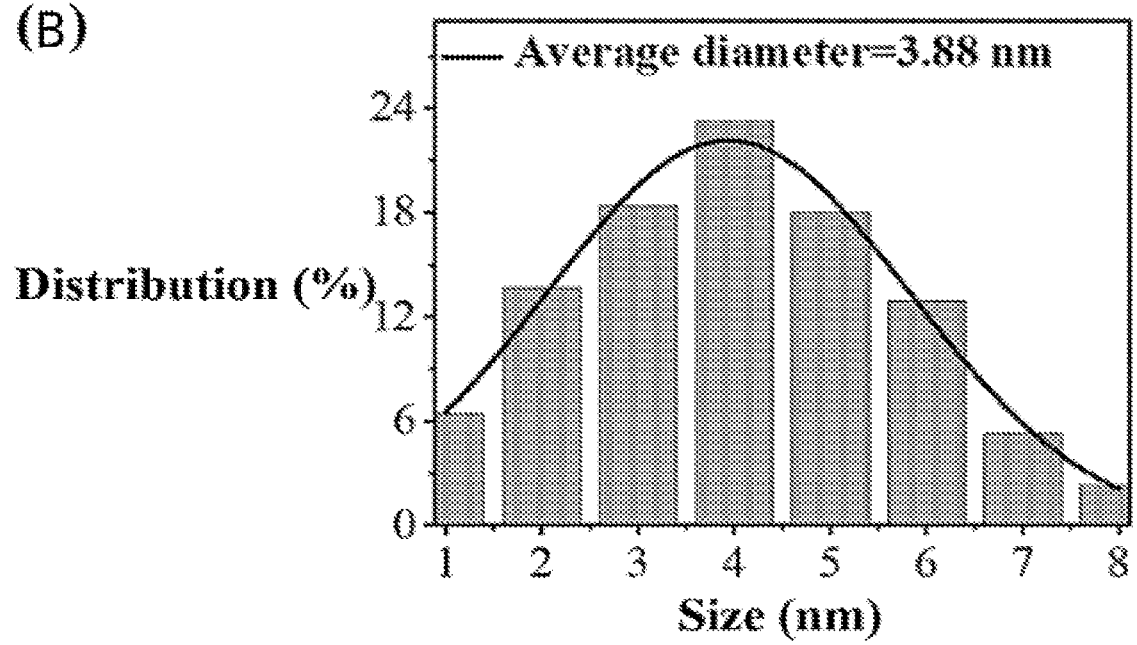
Figure 10:
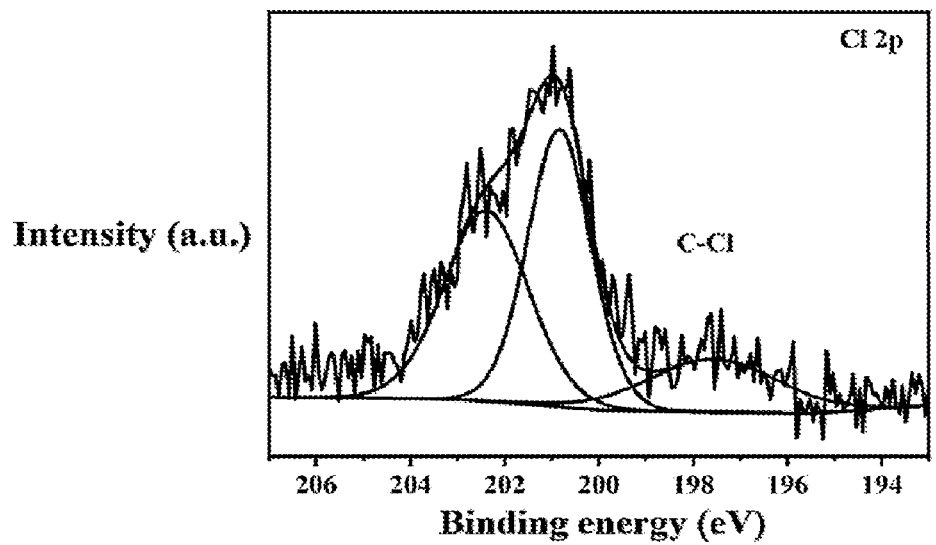
FIG. 10 is XPS survey spectra for the Cl 2p regions of the catalyst prepared in Example 3.

In FIG. 9(A), the TEM image of the Pt\NCl—CNHs shows that the Pt nanoparticles are uniformly loaded on NCl—CNHs. In addition, as shown in FIG. 9(B), the particle size distribution diagram shows that the size distribution of Pt nanoparticles is relatively uniform, mostly between 1-7 nm, and the average spherical diameter of particles is 3.88 nm. The Cl 2p XPS spectrum of Pt\NCl—CNHs is shown in FIG. 10, it can be obviously observed the binding energy at 202.6 eV and 200.8 that belonged to C—Cl bonds. This result indicates that the Cl element is doped into the CNHs successfully.

Example 4

The heteroatom precursor was obtained by mixing fluorine element and graphite powder for 20 min. The polyvinylidene fluoride is selected for substances containing fluorine heteroatoms and the molar ratio of fluorine to carbon atoms is 5%.

The heteroatom precursor is filled into a graphite rod drilled with an outer diameter of 10 mm and an inner diameter of 4 mm. Then the filling is compacted with a pressure of 0.03 MPa.

Put the graphite rod with heteroatom precursor into an arc plasma device which works as anode, a graphite rod sharpened at one end as a cathode, and perform plasma treatment in a 70 kPa ($Ar:N_2=1:5$) atmosphere. Then the working current is 200 A, and the flow rate of cooling water is 5 m/s. After the discharge, let stand for one hour and collect the nitrogen-fluoride atom doped CNHs (NF—CNHs).

The NF—CNHs are dispersed in 40 ml of ethylene glycol, stir for 15 min, then add 1 ml of 0.05 mol $L^{-1}$ chloroplatinic acid ethylene glycol solution and add 800 mg of sodium hydroxide, the solution continued to stir for 15 min. Next, the mixed solution is stirred and heated in an oil bath for 3 h, the stirring rate and heating temperature are 150 r/min and 160° C. respectively. After cooling to room temperature, the mixed solution is washed 5 times with distilled water and ethanol, and is dried in a vacuum drying oven at 60° C. for 12 h to obtain NF—CNHs which are supported platinum catalyst (Pt\NF—CNHs).

Figure 11:
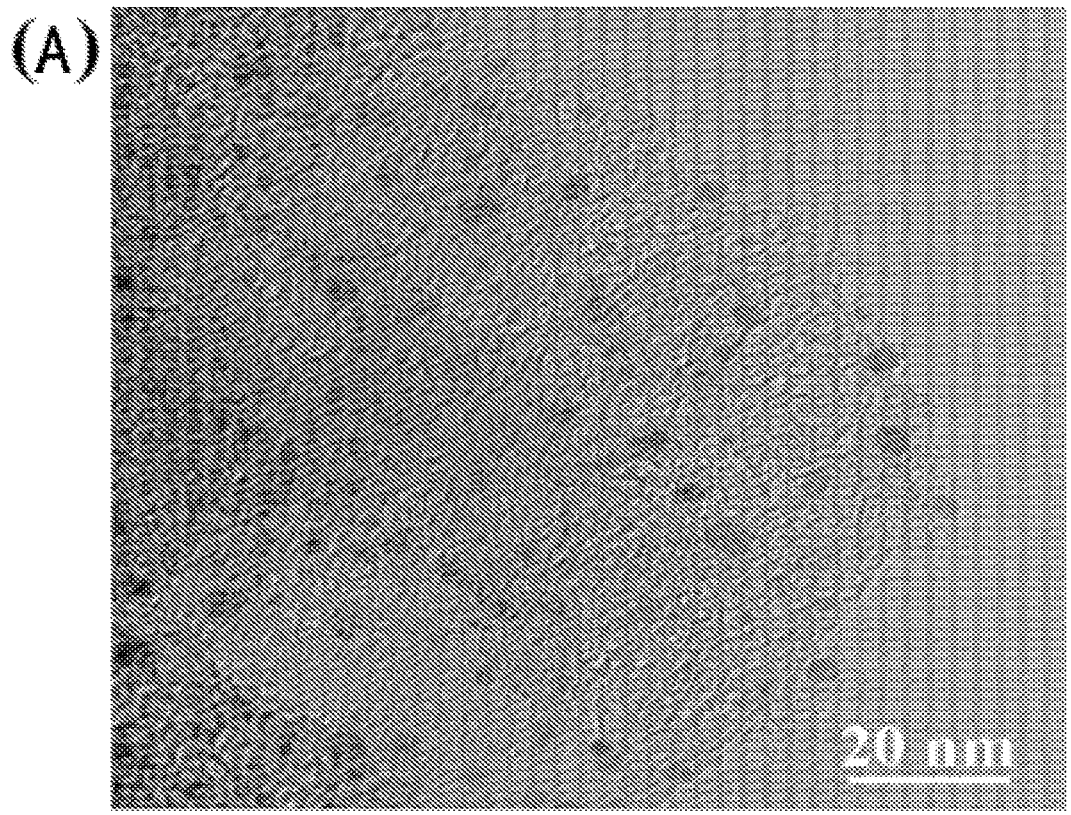
FIG. 11(A) and FIG. 11(B) are TEM image and particle diameter distribution of platinum of the catalyst prepared in Example 4.
Figure 11:
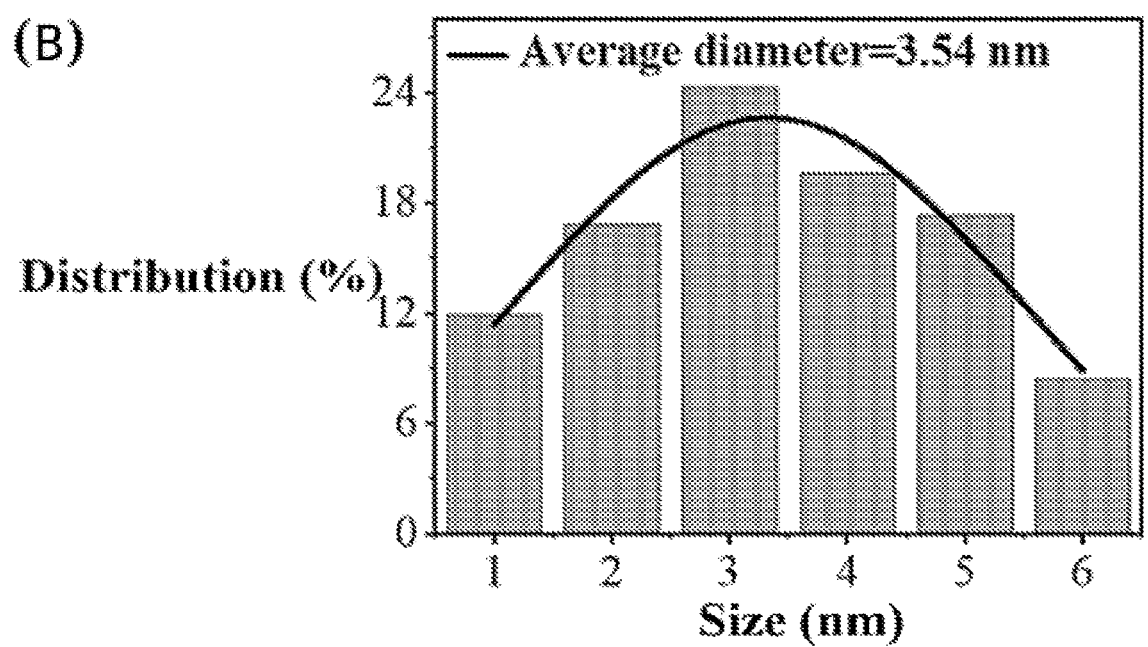
Figure 12:
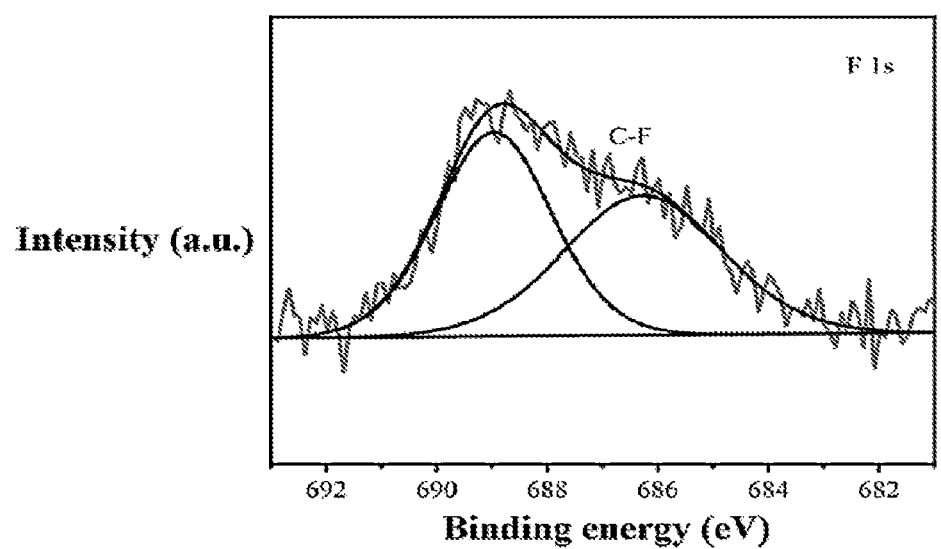
FIG. 12 is XPS survey spectra for the F is regions of the catalyst prepared in Example 4.

In FIG. 11(A), the TEM image of the Pt\NF—CNHs shows that the Pt nanoparticles are uniformly loaded on NF—CNHs. In addition, as shown in FIG. 11(B), the particle size distribution diagram shows that the size distribution of Pt nanoparticles is relatively uniform, mostly between 1-6 nm, and the average spherical diameter of particles is 3.88 nm. The F 1s XPS spectrum of Pt\NF—CNHs is shown in FIG. 12, it can be obviously observed the binding energy at 699 eV and 686.3 that belonged to C—F bonds. This result indicates that the F element is doped into the CNHs successfully.

Example 5

The experiment of Example 1 is repeated, and the ratio of sulfur is adjusted to find the relationship between the amount of sulfur added and the content of sulfur atoms in the NS—CNHs. The test results obtained is shown in the following table (70 kPa N 2).

TABLE 1

|  | Molar ratio of sulfur to carbon atoms | | | |
| --- | --- | --- | --- | --- |
|  | 3% | 5% | 7% | 10% |
| Sulfur atom content | 1.43% | 3.15% | 4.29 | 5.48 |

What is claimed is:
1. A method for preparation of heteroatom-doped CNHs, the method comprising:
 a. mixing materials containing heteroatoms and graphite powder by grinding with a molar ratio of heteroatoms to carbon atoms is 1% to 10% for a first predetermined time to obtain a heteroatom precursor;

b. filling the heteroatom precursor into a first graphite rod with holes and compacting, and drying the graphite rod for a second predetermined time to obtain a graphite rod with heteroatom precursor;

c. putting the graphite rod with heteroatom precursor as an anode into a DC arc plasma device, arranging a second graphite rod sharpened at one end as a cathode opposite to the anode, filling the plasma device with preset gas, and then starting the plasma device to synthesis heteroatom-doped CNHs, wherein the preset gas contains nitrogen gas, during synthesis of the heteroatom-doped CNHs, the nitrogen gas is ionized into nitrogen ions doped in the heteroatom-doped CNHs.

2. The method of claim 1, wherein the materials containing heteroatoms are selected from at least one of sulfur or sulfur-containing organic matter, phosphorus or phosphorus-containing organic matter, nitrogen-containing organic matter, chlorine-containing organic matter, fluorine-containing organic matter, bromine-containing organic matter.

3. The method of claim 1, wherein the first predetermined time is 20-40 min.

4. The method of claim 1, wherein a diameter of the first graphite rod is 10 mm-60 mm and a diameter of each of the holes on the first graphite rod is 5-10 mm, the compaction pressure of the heteroatom precursor in the graphite rod is 0.02 MPa to 0.05 MPa; the predetermined temperature and predetermined time for drying are 60-80° C. and 4-6 h respectively.

5. The method of claim 1, wherein a diameter of the second graphite rod is the same as the first graphite rod, and a distance between the cathode and the anode is 2-4 mm.

6. The method of claim 1, wherein a pressure of the preset gas is 50-90 kPa, a working current of the DC arc plasma device is higher than 150 A.

7. The method of claim 1, wherein the preset gas is one of nitrogen, nitrogen argon gas mixture, nitrogen hydrogen mixture, and nitrogen helium mixture.

8. The method of claim 7, wherein a ratio of other gas to nitrogen in the preset gas is 0-20%.

9. The method of claim 1, wherein the synthesis of the heteroatoms-doped CNHs further comprises quenching, a flow rate of cooling water used in the quenching is 1-5 m/s.

* * * * *